(12) United States Patent
Lorenz et al.

(10) Patent No.: US 6,357,787 B2
(45) Date of Patent: Mar. 19, 2002

(54) GAS BAG MODULE COVER

(75) Inventors: Christian Lorenz, Leidersbach; Ralph Neupert, Kleinwallstadt, both of (DE)

(73) Assignee: TRW Automotive Safety Systems GmbH & Co. KG, Aschaffenburg (DE)

(*) Notice: Subject to any disclaimer, the term of this patent is extended or adjusted under 35 U.S.C. 154(b) by 0 days.

(21) Appl. No.: 09/726,667

(22) Filed: Nov. 29, 2000

(30) Foreign Application Priority Data

Dec. 30, 1999 (DE) .................................. 299 22 988 U

(51) Int. Cl.[7] .............................................. B60R 21/20
(52) U.S. Cl. ................................. 280/728.3; 280/731
(58) Field of Search ......................... 280/728.1, 728.3, 280/731, 732

(56) References Cited

U.S. PATENT DOCUMENTS

| | | | |
|---|---|---|---|
| 5,092,627 A | | 3/1992 | Igawa |
| 5,306,040 A | | 4/1994 | Leonelli et al. |
| 5,456,490 A | * | 10/1995 | Carter et al. ............. 280/728.3 |
| 5,588,668 A | * | 12/1996 | Emambakhsh et al. .. 280/728.2 |
| 5,893,578 A | * | 4/1999 | Berger ..................... 280/728.1 |
| 5,893,581 A | * | 4/1999 | Niederman ................ 280/731 |
| 5,897,133 A | * | 4/1999 | Papandreou ............. 280/728.2 |
| 6,142,510 A | * | 11/2000 | Endo et al. ................. 280/731 |

FOREIGN PATENT DOCUMENTS

| | | |
|---|---|---|
| DE | 2320272 | 11/1973 |
| DE | 19704195 | 10/1998 |
| DE | 29922987 | 6/2000 |
| DE | 20009378 | 11/2000 |
| JP | 07061310 | 3/1995 |

* cited by examiner

*Primary Examiner*—Paul N. Dickson
*Assistant Examiner*—Faye M. Fleming
(74) *Attorney, Agent, or Firm*—Tarolli, Sundheim, Covell, Tummino & Szabo L.L.P.

(57) ABSTRACT

The invention relates to a gas bag module cover, comprising at least one opening portion for closing an outlet opening, and a predetermined tear line along which the cover is opened in a restraint situation and which defines one opening portion of the cover. The gas bag module further comprises at least one first hinge portion provided on the cover the opening portion remaining connected with the cover via the first hinge portion when the cover is opened. The opening portion has at least one second hinge portion which divides the opening portion into partial sections and allows a movement of the partial sections relative to each other. Further, the invention relates to a vehicle steering wheel which is equipped with such a gas bag module cover.

7 Claims, 2 Drawing Sheets

GAS BAG MODULE COVER

TECHNICAL FIELD

This invention relates to a gas bag module cover and to a vehicle steering wheel provided with a gas bag module cover according to the invention.

BACKGROUND OF THE INVENTION

In a restraint situation, a cover of a gas bag module is torn up by the deploying gas bag or by some other means and is intended to release the initially closed outlet opening as quickly as possible. The swiveling radius of the opening portion should be rather small here, in order to minimize the risk for the occupant to be hit by the opening portion swiveling towards outside. While there is no risk for occupants having the ideal sitting position, occupants might for instance lean against the dashboard or the steering wheel and be hit by the opening portion swiveling towards outside in the case of restraint.

BRIEF SUMMARY OF THE INVENTION

The invention provides a gas bag module cover which distinctly reduces the risk of injury originating with the opening portion. This is achieved in a gas bag module cover which comprises at least one opening portion for closing an outlet opening, and a predetermined tear line along which the cover is opened in a restraint situation and which defines the at least one opening portion of the cover. The gas bag module further comprises at least one first hinge portion provided on the cover, via which first hinge portion the opening portion, when said cover is opened, remains connected with the cover. The opening portion has at least one second hinge portion which divides the opening portion into partial sections and allows a relative movement of the partial sections. By means of the second hinge portion, which divides the opening portion, the stability of the opening portion is reduced after the cover has been opened, as the second hinge portion allows partial sections to move relative to each other, i.e. to preferably be swiveled towards each other. Hence it is possible that the radius of movement of the opening portion is reduced. The opening portion can be kinked about the second hinge portion, which is for instance caused by the deploying gas bag, the partial sections thus swivel towards each other, and in this kinked or partly kinked condition the opening portion will then move towards outside. A further advantage of the invention consists in that the opening portion, which forms a flap, may indeed partly be directed towards the occupant upon deployment of the gas bag and possibly upon deflation of the gas bag after the accident, but in the case of a secondary impact, where the occupant gets in contact with the opening portion, causes no injuries due to its low stability. The stability, above all against kinking, is decreased by the second hinge portion. Moreover, in the open condition of the opening portion, the partial sections are not aligned parallel to each other, so that a force exerted on the edge defining the outer end of the opening portion can be very small in order to kink the opening portion.

Preferably, the first and the second hinge portion extend parallel to each other, so as not to exert any torsional forces on the opening portion.

Hinge portions may be formed by film hinges, i.e. by portions of the gas bag module cover with a reduced thickness, which reduces the manufacturing costs.

In accordance with one aspect, the cover according to the invention also has a front wall and a side wall, which is common practice particularly with covers for steering wheel gas bag modules. In this embodiment, the first hinge portion is provided in the side wall. Due to this position of the first hinge portion, the opening portion will move less far towards the occupant than in an embodiment in which the first hinge portion is provided at the front wall.

When the hinge portions offers different resistances to a swivel movement of the portions of the cover pivotally mounted at the same and/or different resistances in the possible opposite swiveling directions, the path of movement of the individual partial sections when the cover is opened can be influenced such that for instance the opening portion is kinked in the first opening phase, before the opening portion as a whole is completely swiveled to the outside. The positions of the hinge portions and possibly the opening behavior of the gas bag may also influence the course of the opening process.

The cover according to the invention may be suitable for any kind of module cover, either for side gas bag modules, passenger modules, in which case the cover is part of the dashboard, or for driver-side steering wheel modules.

The invention also relates to a vehicle steering wheel comprising a steering wheel rim, a gas bag module as well as a cover according to the invention. The position of the first and the second hinge portions and the position of the tear line are coordinated with the steering wheel rim such that the opening portion can swivel to axially behind the steering wheel rim, so that in the fully open condition of the cover the opening portion is positioned as far away from the occupant as possible.

To prevent the opening portion from swiveling back, the hinge portions are coordinated with each other such that upon axially swiveling to behind the steering wheel rim, the opening portion is prevented from swiveling back by the steering wheel rim itself, which in this case acts as stop.

DETAILED DESCRIPTION OF THE PREFERRED EMBODIMENTS

Figure 1:
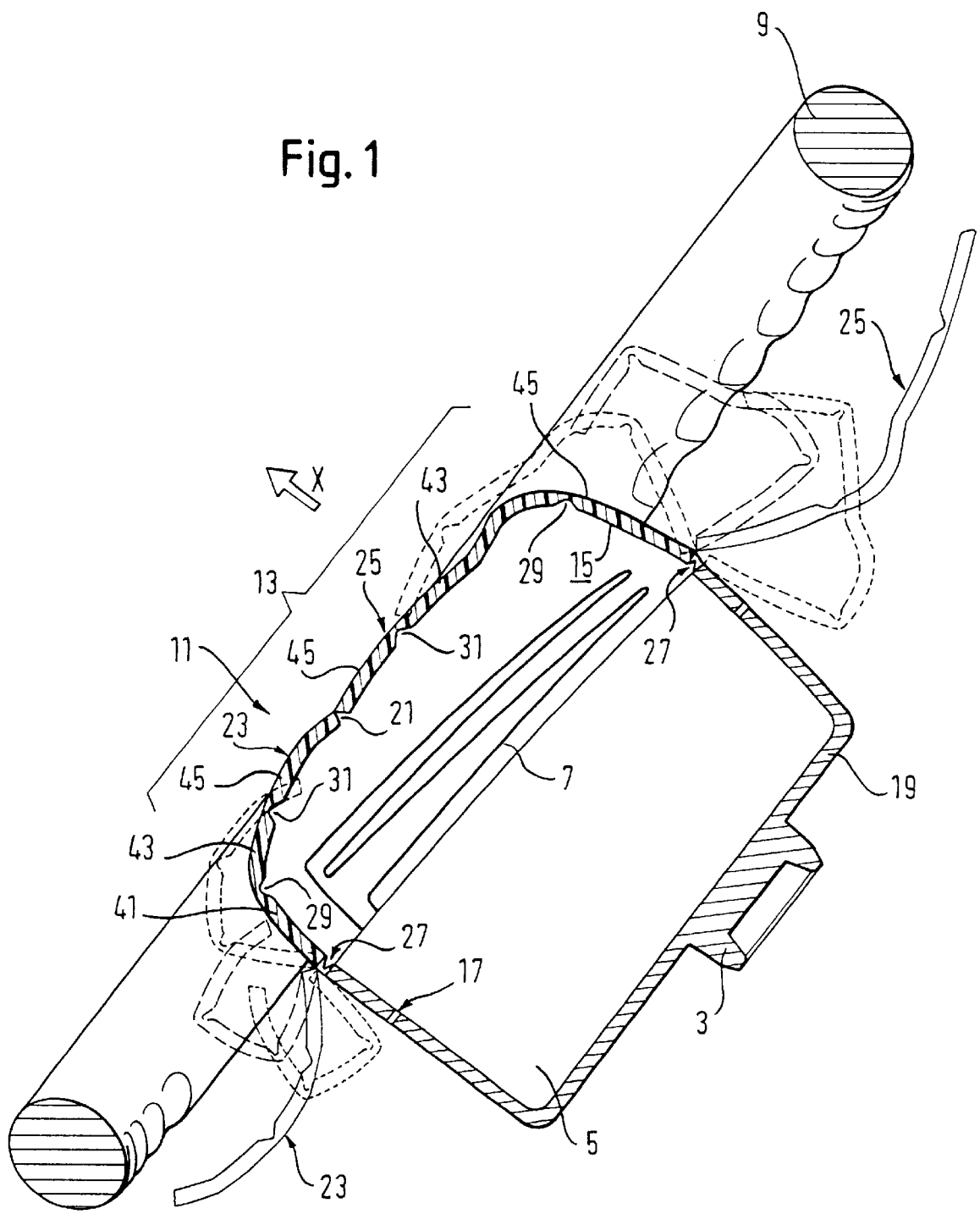
FIG. 1 shows a schematic cross-sectional view of a vehicle steering wheel according to the invention, with a cover according to the invention.

FIG. 1 represents a vehicle steering wheel which in the vicinity of the hub 3 has a gas bag module including a gas generator 5 and a gas bag 7. Reference numeral 9 designates a steering wheel rim. A pot-shaped gas bag module cover, subsequently only briefly referred to as cover 11, closes the gas bag module towards the front side. The cover 11 has a front wall 13 and a surrounding side wall 15 integrally molded on the front wall 13. In the region 17, the cover 11 is connected with a likewise pot-shaped module container 19, which may also be a pot-shaped steering wheel hub 3. The cover 11, which is made of plastic material, has a plurality of predetermined tear lines which in a top view have the shape of an "H", only the transverse web of the "H" being shown in FIG. 1, which transverse web is provided with the reference numeral 21 and is subsequently referred to as tear line 21. The tear lines define two opening portions 23, 25 forming two flaps, which close the outlet opening (which has the extent for instance of the front wall 13) for the gas bag 7 in the non-activated condition. Apart from the tear lines 21, each opening portion 23, 25 is also defined by an associated first hinge 27, subsequently referred to as hinge portion 27, which forms the transition from the opening portions 23, 25 to the rest of the cover 11. The first hinge portions 27 are produced by film hinges, i.e. recesses in the cover 11, and are disposed in the vicinity of the side wall, i.e. as far away from the occupant as possible. Moreover, each opening portion 23, 25 has a second and a third hinge portion 29 and 31, respectively, the second hinge portion 29 being disposed in the vicinity of the transition from the end wall 15 to the front wall 13, and the third hinge portions 31 being disposed between the second hinge portions 29 and the tear line 21. The second and third hinge portions 29, 31 are also formed by film hinges. Moreover, all hinge portions 27 to 31 are disposed parallel to each other and extend in a line-shaped form. The second and third hinge portions divide each opening portion 23, 25 into partial sections 41 to 45, which can be swiveled towards each other by the hinge portions, as will be explained below.

When the gas generator 5 is activated and the gas bag 7 is inflated, the gas bag 7 causes the cover 11 to burst along the tear lines, for instance along the tear line 21, so that the opening portions 23, 25 are separated from the remainder of the cover and remain fixed at the rest of the cover 11 only via the first hinge portions 27. The movements of the opening portions 23, 25 while the cover is opened are represented in broken lines in various phases of the movement. The final position, when both opening portions 23, 25 are completely swiveled to the outside, is finally shown in continuous lines.

The hinge portions 29, 31 offer different resistances to the partial sections being swiveled about the axes formed by them. The hinge portions 29 for instance offer a smaller resistance to being swiveled than the hinge portions 31, which can for instance be achieved by the reduced thickness of the cover in the vicinity of the second hinge portions 29. By means of the different resistances offered by the hinge portions to a swivel movement, and by means of the points at which the deploying gas bag 27 contacts the opening portions in the initial phase of the opening movement, it can be achieved that both opening portions 23, 25 first of all kink in the vicinity of the second hinge portions 29, before a similar kinking movement occurs in the vicinity of the third hinge portions 31.

Due to the fact that by means of the two hinge portions 29 the two partial sections 43, 51 are first of all swiveled towards the partial section 41 and a distinct swivel movement of the partial section 45 towards the partial section 43 is effected only later, both opening portions 23, 25 are hardly swiveled in the direction X towards the driver. The opening movement rather is a kinking of the opening portions 23, 25 and a movement of these kinked opening portions towards outside and to the rear. Such kinking on the whole results in a smaller swiveling radius of both opening portions 23, 25 about the hinge portions 27, which leads to a smaller hazard potential of the moving opening portions 23, 25. During the swivel movement of these flap-like opening portions 23, 25, the same move past the steering wheel rim 9 at a distance from it, as is represented in broken lines, to axially behind the steering wheel rim 9. The two opening portions 23, 25, which were folded together almost to form a "U", will be folded apart again at the end of the swivel movement, as is represented in continuous lines. Folding back is, however, no longer possible since, as can be seen in FIG. 1, after being folded apart both opening portions 23, 25 are folded apart to such an extent that they can strike against the steering wheel rim 9. The geometry of the opening portions 23, 25 is thus adjusted to the position of the steering wheel rim 9 such that the latter acts as a stop for the two opening portions 23, 25 fully swiveled to the outside. In the case of a secondary impact, the opening portions 23, 25 by no means protrude in the direction of the occupant.

Figure 2:
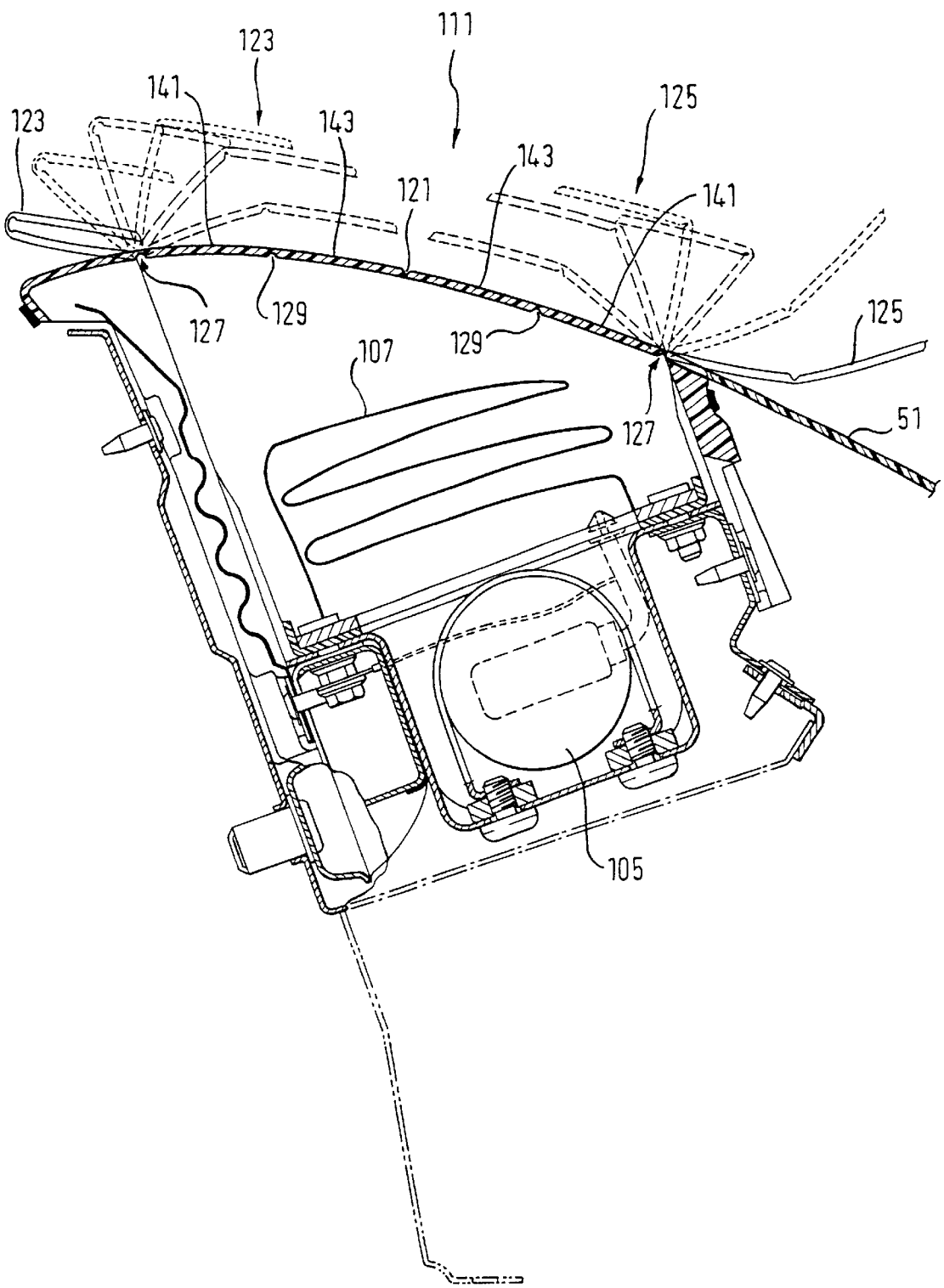
FIG. 2 shows a second embodiment of the gas bag module cover according to the invention, in a cross-sectional view, the cover being integrated in the dashboard on the side of the passenger.

FIG. 2 represents a second embodiment of the gas bag module cover according to the invention. The cover is, however, integrally mounted in the dashboard 51 on the passenger side. However, the mode of function of the cover when it is opened is the same as in the embodiment shown in FIG. 1, so that for explanation purposes reference may be made to the description of FIG. 1. The parts having the same function are also provided with the same reference numerals, increased by 100.

It should, however, be mentioned that the cover only consists of a front wall and has no side walls. Moreover, only two hinge portions are provided, namely first hinge portions 127, which form the transition from the opening portions 123, 125 to the rest of the dashboard 51, and second hinge portions 129, which divide each opening portion 123, 125 into partial sections 141 and 143.

In this embodiment, too, a kinking of the opening portions 123, 125 when the cover 111 is opened is achieved by the second hinge portion 29. The swiveling radii of both opening portions 123, 125 can thereby be reduced. Even for the case that the two opening portions 123, 125 can swivel back again, after they have completely swiveled towards outside and the gas bag has been deflated, they will not protrude towards the occupant as a rigid, large-surface flap. The second hinge portions 129 provide for the two flap-like opening portions 123, 125 kinking again when the occupant hits the latter.

What is claimed is:

1. A vehicle steering wheel with a steering wheel rim, a gas bag module and a gas bag module cover which comprises at least one opening portion for closing an outlet opening, a predetermined tear line along which said cover is opened in a restraint situation and which defines said opening portion of said cover, and at least one first hinge portion provided on said cover, said opening portion remaining connected with said cover via said first hinge portion when said cover is opened, said opening portion having at least one second hinge portion which divides said opening portion into partial sections and allows a movement of said partial sections relative to each other when said cover is opened, a position of said hinge portions and a position of said tear line being coordinated with respect to said steering wheel rim such that said opening portion can swivel to axially behind said steering wheel rim.

2. The steering wheel as claimed in claim 1, wherein said hinge portions are coordinated with each other such that after having swiveled to axially behind said steering wheel rim said opening portion is prevented from swiveling back by said steering wheel rim acting as a stop.

3. The steering wheel as claimed in claim 1, wherein said second hinge portion extends parallel to said first hinge portion.

4. The steering wheel as claimed in claim 1, wherein at least one hinge portion is formed by a film hinge.

5. The steering wheel as claimed in claim 1, wherein said cover has a front wall and a side wall and said first hinge portion is provided in said side wall.

6. The steering wheel as claim in claim 1, wherein said second hinge portion defines an axis and is formed such that, in both opposite swiveling directions about said axis, it offers different resistances to a swivel movement of said partial section disposed further to the outside when said cover is opened.

7. The steering wheel as claimed in claim 1, wherein said hinge portions define axes and offer such resistances against swiveling about said axes and said hinge portions are disposed at such locations that said opening portion is swiveled in a condition kinked about said second hinge portion.

* * * * *